E. G. JAY, Jr.
REGISTERING AND RECORDING INSTRUMENT FOR METERS.
APPLICATION FILED AUG. 4, 1917.
1,264,522.
Patented Apr. 30, 1918.
Fig.1.
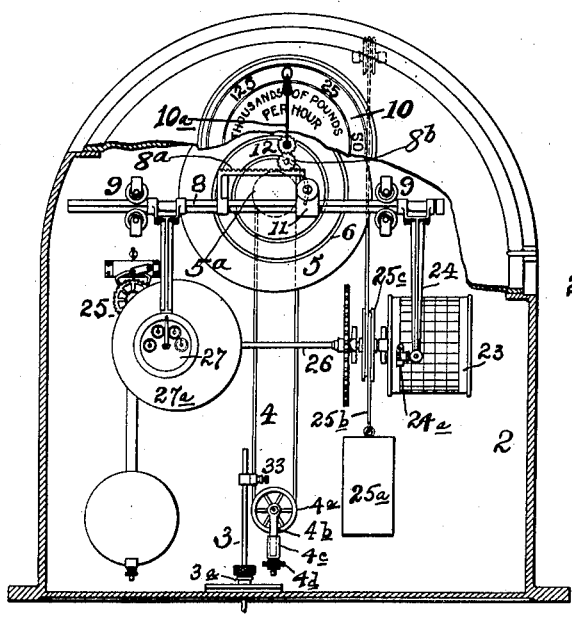
Fig.2.
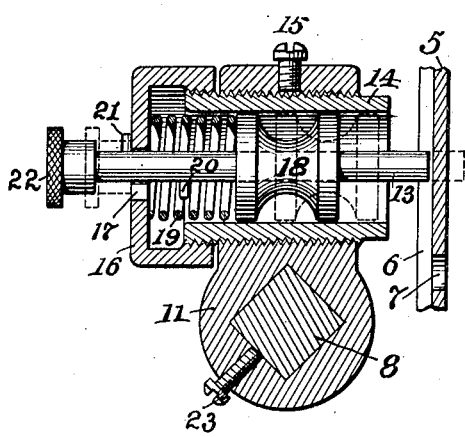
Fig.3.
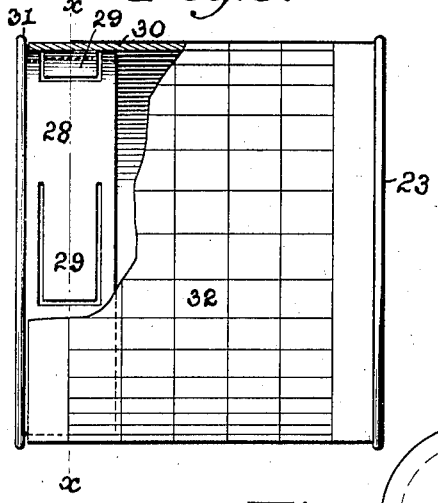
Fig.4.
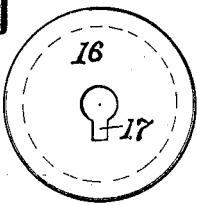
Fig.5.
Inventor
Edward G. Jay, Jr.
By
His Attorney

UNITED STATES PATENT OFFICE.

EDWARD G. JAY, JR., OF PHILADELPHIA, PENNSYLVANIA, ASSIGNOR TO WARREN WEBSTER & COMPANY, A CORPORATION OF NEW JERSEY.

REGISTERING AND RECORDING INSTRUMENT FOR METERS.

1,264,522.  Specification of Letters Patent.  Patented Apr. 30, 1918.

Application filed August 4, 1917. Serial No. 184,506.

*To all whom it may concern:*

Be it known that I, EDWARD G. JAY, Jr., citizen of the United States, and resident of Philadelphia, county of Philadelphia, and State of Pennsylvania, have invented an Improvement in Registering and Recording Instruments for Meters, of which the following is a specification.

My invention has particular reference to a type of registering and recording instrument for water meters commonly employed in industrial plants and in which the volume of water flow over a V-notch weir is automatically registered and recorded.

Among the objects of my invention is the provision of means for "setting" the instrument to absolute zero of the notch or weir; that is to say, at the time when the water in the meter has fallen to the level corresponding to absolute zero of the notch or weir, the registering and recording means constituting my present invention is positively "set" to zero to secure accuracy in the registration and recording. More particularly, my object is to provide means for locking the traverse bar to the operating groove of the cam disk at the zero position of the indicating, registering and recording devices, and then adjusting the connection between the float actuated rod and the motive means for the cam disk.

A further object of my invention is to provide a simple and effective means for supporting the record sheet for receiving the recording of the water level in the meter on the receiving chamber side of the weir, whereby the support with its record sheet may be quickly attached or removed and also adjusted circumferentially to insure the zero line of the record chart being initially adjusted under the pen or pencil constituting the marker.

My object is further to so provide the connection between the cam disk and the traverse bar (whereby rotary motion is transformed into rectilinear motion) whereby the pin connection on the bar may be adjusted to engage the groove of the cam in a normal manner for operation, may be advanced to enter a hole in the disk to lock it and the bar in definite relative positions corresponding to "zero" and may also be withdrawn out of engagement with the groove and disk, as desired in the manipulation of the apparatus, all as described hereinafter.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings: Figure 1 is a front view of my improved registering and recording means for meters; Fig. 2 is a cross section of a part of same, more particularly relating to the means for connecting the traverse bar with the spiral operating cam; Fig. 3 is an elevation of the drum for holding the paper upon which the meter results are recorded; Fig. 4 is a cross section of the same on line $x$—$x$ of Fig. 3; and Fig. 5 is an end view of a portion of the pin holding means shown in Fig. 2.

In apparatus of the character of the present invention, the meter is provided with a notch or weir over which the water to be measured flows. The varying height of the surface level of the water thus flowing through the meter is made a function of the formulæ for determining the volume of water flowing over the V-notch weir in any period of time. The present invention relates to the registering and recording means which is controlled in its operation by the level of the water flowing over the weir of the meter. I have not shown the meter or its weir nor the float actuated by the level of the water therein flowing over the weir, as these are well known and do not form any material part of my invention.

2 represents a case of the register and recorder, and may be of any suitable shape and construction. 3 is the float rod and is reciprocated vertically by a float (not shown) and actuated by the water in or communicating with the receiving chamber of the meter proper. This rod 3 is guided vertically through a suitable seal box 3ª which prevents vapor passing into the chamber of the case and offers but little resistance to the reciprocation of the rod. The upper end of rod 3 is clamped to an endless sprocket chain or band 4 which passes about an idler wheel 4ª near the bottom of the case and about a sprocket wheel 5ª, giving to a spiral cam disk 5 a rotary reversing motion as the float and its rod 3 rises and falls. The guide wheel 4ª is supported on a bearing in vertical rod 4ᵇ, which is guided in a guide 4ᶜ and adjusted by a nut 4ᵈ screwed upon its lower end and pressing upon the end of the bearing. In this manner the desired tension may be put upon the sprocket chain or band. The cam disk 5 is provided with a spiral cam groove 6, the form of the spiral being specially shaped according to requirements to meet conditions of flow through or over the weir of the meter. This cam groove 6 receives and operates a pin 13 (Fig. 2) carried by the traverse bar 8, which is thereby reciprocated to simultaneously operate the indicator, move the recording pen or pencil and actuate the integrator or register.

The traverse bar 8 is arranged horizontally and guided between guide wheels 9 to reduce friction to a minimum. The pin 13 is mounted in a carrier 11 secured to the bar 8 by the set screw 23; and said pin rides in the groove 6 of the cam disk 5 and thereby transforms the revolving motion of the disk into the reciprocating horizontal motion of the bar which actuates the pen and counter or integrating mechanism.

While normally engaging the groove of the cam disk, there are three positions of the pin obtainable. It is desirable to have the pin act as a stop or lock to the disk while "setting" the entire instrument to zero; and to accomplish this result there is a hole 7 drilled in the bottom of the groove 6 of the disk into which the pin may be inserted, said hole corresponding to the zero of the disk and all of the other parts of the instrument. For example the pointer 10ª of the indicator will point to zero, the pen 24ª will be positioned at the zero line of the record sheet 32, and the integrator 27 will be moved to the central or zero point of the clock operated disk 27ª. The clock for operating the integrator disk and the recording drum is shown at 25 and may be of any suitable construction. The shaft for driving the drum 23 is indicated at 26. The transmitting connections may be of any suitable construction to impart a slow rotation to the drum; and the clock may be driven by weight 25ª and cable 25ᵇ passing about a sheave 25ᶜ.

The traverse bar 8 has secured to it a rack 8ª which, through gears 8ᵇ, operates the pointer 10ª over the indicator dial 10, which is designed to visually indicate the approximate quantity of water flowing through the meter in "thousands of pounds per hour."

Referring to the pin connection between the traverse bar 8 and the disk 6, shown in Fig. 2, the carrier 11 is bored transversely and internally screw-threaded, and screwed therein is the threaded tubular cylinder guide 14. This guide 14 may be secured in any position of adjustment on the carrier by the set screw 15. Sliding in the guide 14 is a piston 18 through which a pin 13 extends, one end engaging the groove 6 of the cam disk and the other end extended beyond the opposite end of the guide and provided with a head 22 by which to grasp it for adjustment. A head or cap 16 is screwed over the end of the guide and is provided with a central hole having a lateral slot as indicated at 17, in Figs. 2 and 5. The pin 13 is provided with two laterally projecting studs 20 and 21 arranged at different distances from the piston, and said studs are adapted to pass through the slots 17 when longitudinally adjusting the pin 13. A coil spring 19 surrounds the pin 13 and is arranged within one end of the guide 14 and between the piston 18 and the cap 16. It will now be seen that when the pin 13 is in the position of adjustment shown in Fig. 2, its end just enters the groove 6 of the disk 5, but does not contact with the bottom thereof. In this position the stud 21 of the pin 13 is drawn through the slot 17 and the pin turned to let the stud rest against the outer surface of the cap 16. When it is desired to lock the bar 8 and the disk 5, the pin 13 is turned until the stud 21 comes into alinement with the slot 17 in the cap, allowing the end of the pin 13 to enter the hole 7 in the bottom of the groove 6 when the said disk 5 is turned, the spring 19 forcing the pin toward the disk until stopped by the head 22 (see dotted lines). In case the pin 13 is to be disengaged from the disk, it is pulled back away from the disk until the stud 20 passes through the slot 17 and is made to engage the outer surface of the cap 16. This enables the traverse bar or disk to be operated by hand independently when desired. In case more clearance is required between the guide 14 and disk 5, the former may be screwed back into the carrier and in this way withdraw both the guide 14 and pin 13 away from the cam disk, so that it may have more freedom of movement in case its removal, for any cause, is necessary. By this construction, the piston support for the pin 13 may be brought up close to the disk while sustained by the tubular guide 14 and consequently the pin itself may be of small diameter without weakness.

At one end of the traverse bar 8 is secured the downwardly extending arm 24 having on its end the recording pen or pencil 24a, which rests by gravity upon the record sheet 32 which is wrapped about the cylinder 30 of drum 23.

The drum comprises a flanged head 28ª, the flange 28 of which is cylindrical and formed with a shallow rim 31. The cylindrical flange has a plurality of tongues 29 formed thereon, and these are bent outwardly so as to constitute springs to impart a friction upon the cylinder 30 when pushed over the flange 28. By this construction the cylinder 30 may be quickly removed or replaced upon the clock driven head 28, 28ª, when a new record sheet 32 is to be substituted for a finished record. Furthermore, the cylinder 30 is free to be adjusted both circumferentially and axially so that when the pen 24ª is locked by the locking of the traverse bar 8, the record sheet may be adjusted under the pen to bring the zero line and position directly under the said pen. By this means the chart or record sheet may be set at any time without interfering with the other devices.

The integrator devices for registering the total volume of water which flows over the weir in a given time, are of usual construction and will need no special description. It will suffice to say that the disk 27ª is rotated at a constant speed by the clock 25 and that the integrator 27, containing the registering dials, is operated by a friction wheel (not shown) resting against the disk 27ª and traversed from the center of the disk radially toward its periphery by the traverse bar 8. The speed of the dials is therefore varied according to the position of the traverse bar 8, due to changes in the surface level of the water flowing over the weir.

When the apparatus is to be put into action, the level of the water in the meter is brought to the absolute zero of the V-notch weir (not shown); the clamp screw 33 is loosed, and the disk 5 is rotated until the hole 7 comes under the pin 13, which is then released and enters the hole, locking the disk and bar. When this is done the set screw 33 is adjusted to clamp the sprocket chain or band 4 to the float rod 3. The several parts will then be "set" at zero. The pin 13 is then pulled back and turned so that the stud 21 rests upon the cap 16 and holds the pin 13 in the position shown in Fig. 2, in which it is within the cam groove 6 but held clear of the bottom thereof. The clock is then started and the meter put into operation.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

In this application I make no claim to the specific construction of the chart carrying cylinder or drum, as the same forms subject matter of a pending applicatiotn.

Having now described my invention, what I claim as new and desire to secure by Letters Patent, is:—

1. In a device of the character stated, a rotating part having a cam groove and a hole in the bottom of the groove at its initial or zero point, in combination with a reciprocating traverse bar, a tubular guide on the bar, a pin guided in the guide and adapted to engage the cam groove and enter the hole thereon, a spring to force the pin toward the cam groove, and means for adjusting the pin in position to engage the cam groove only or to enter the hole therein, as desired.

2. In a device of the character stated, a rotating part having a cam groove and a hole in the bottom of the groove at its initial or zero point, in combination with a reciprocating traverse bar, a tubular guide on the bar, a pin guided in the guide and adapted to engage the cam groove and enter the hole thereon, a spring to force the pin toward the cam groove, and means for adjusting the pin in either of three positions so as to engage the cam groove only or to enter the hole therein or to be held back entirely clear of the cam groove, as desired.

3. In a device of the character stated, a rotating part having a cam groove and a hole in the bottom of the groove at its initial or zero point, in combination with a reciprocating traverse bar, a tubular guide on the bar, a pin guided in the guide and adapted to engage the cam groove and enter the hole thereon, a spring to force the pin toward the cam groove, and means for adjusting the pin in position to engage the cam groove only or to enter the hole therein, as desired, said means comprising a slotted cap through which the pin extends and the pin having a projecting stud adapted to pass through the slot in the cap and by turning of the pin engage the top of the cap when it is desired to have the pin adapted to the groove.

4. In a device of the character stated, a rotating part having a cam groove and a hole in the bottom of the groove at its initial or zero point, in combination with a traverse bar, a carrier on the bar, an adjustable tubular guide on the carrier and adjustable to or from the cam groove part, a pin adjustably guided in the guide, a spring to force the pin toward the cam groove, and means for adjusting the pin relatively to the tubular guide and cam groove.

5. In a device of the character stated, a rotating part having a cam groove and a hole in the bottom of the groove at its initial or zero point, in combination with a traverse bar, a carrier on the bar, an adjustable tubular guide on the carrier and adjustable to or from the cam groove part, a pin adjustably guided in the guide, a spring to force the pin toward the cam groove, and means for adjusting the pin relatively to the tubular guide and cam groove comprising a closed cap for the guide having a slotted aperture and a pair of studs on the pin, said studs at a distance apart and adapted to be drawn through the slotted aperture and made to engage the outer surface of the cap, whereby the pin is held in engagement with the groove only or adjusted into the hole of the groove, or held back out of contact with the groove, as desired.

6. In a device of the character stated, the combination of a rotating disk having a spirally arranged cam part, a traverse bar, and a pin connection between the traverse bar and cam part consisting of a tubular guide on the traverse bar, a piston in said tubular guide, a pin secured to the piston, a cap on the guide having a slotted aperture through which the pin extends, a spring surrounding the pin and arranged between the piston and cap, and a stud projecting laterally from the pin and adapted to be drawn through the aperture of the cap to lock thereon to hold the pin in operative engagement with the cam part of the disk.

7. In a device of the character stated, the combination of a rotating disk having a spirally arranged cam part, a traverse bar, and a pin connection between the traverse bar and cam part consisting of a tubular guide on the traverse bar, a piston in said tubular guide, a pin secured to the piston, a cap on the guide having a slotted aperture through which the pin extends, a spring surrounding the pin and arranged between the piston and cap, and a plurality of studs projecting laterally from the pin and adapted to be drawn through the aperture of the cap to lock thereon to hold the pin in operative engagement with the cam part of the disk or for holding it entirely out of engagement with the cam part.

8. In a device of the character stated, the combination of a rotating cam part, a traverse bar for the registering devices operated by the cam part, an endless band for rotating the cam part, an idler wheel for holding the band in a vertical position under tension, a vertical float rod, an adjustable connection between the float rod and band whereby the band is moved by the rod, and tension devices for the idler wheel for adjusting the tension of the band.

9. In a device of the character stated, the combination of a rotating cam part, a traverse bar for the registering devices operated by the cam part, an endless band for rotating the cam part, an idler wheel for holding the band in a vertical position under tension, a vertical float rod, an adjustable connection between the float rod and band whereby the band is adjusted to and thereafter moved by the rod, and means for locking the traverse bar and cam part at the initial zero point of the cam.

10. In a device of the character stated, the combination of an integrating device having a marker, and a rotating chart carrying device for moving the chart under the marker, said chart carrying device having capacity for circumferential adjustment under the marker without disturbing the adjustment of the integrating device.

11. In a device of the character stated, the combination of a cam disk, a float rod and power transmitting connections between the float rod and cam disk to rotate it, a traverse rod, means between the cam disk and traverse rod to reciprocate the latter by the rotation of the former, means to lock the traverse bar to the cam disk when at its zero position, an integrator register controlled by the movements of the traverse bar, and a recording means also controlled by the movements of the traverse bar.

In testimony of which invention I hereunto set my hand.

EDWARD G. JAY, Jr.

Witnesses:
E. W. SMITH,
R. E. SMITH.